Figure 1:
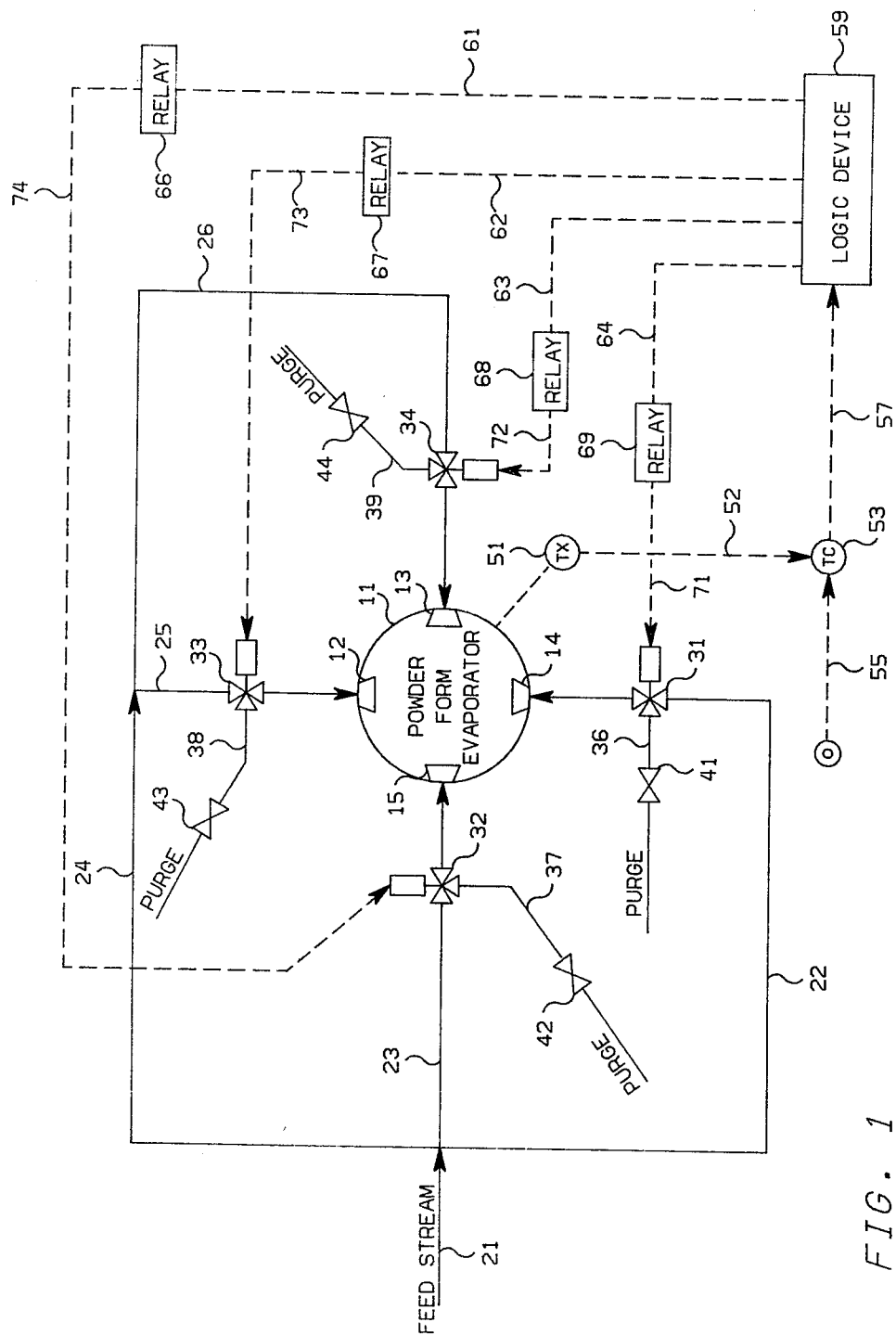

United States Patent [19]

King

[11] 4,263,091
[45] Apr. 21, 1981

[54] FLUID FLOW CONTROL

[75] Inventor: William R. King, Bartlesville, Okla.

[73] Assignee: Phillips Petroleum Company, Bartlesville, Okla.

[21] Appl. No.: 115,312

[22] Filed: Jan. 25, 1980

[51] Int. Cl.³ .............................................. B01D 1/00
[52] U.S. Cl. .............................. 159/44; 159/DIG. 10; 137/110; 239/75; 239/112; 528/503k
[58] Field of Search ............................ 137/88, 90, 110; 159/44, DIG. 10; 528/501–503; 239/61, 75, 112, 104, 105

[56] References Cited

U.S. PATENT DOCUMENTS

| 3,374,211 | 3/1968 | Marwil et al. | 528/503 |
| 3,782,632 | 1/1974 | Braun et al. | 239/112 |
| 3,806,030 | 4/1974 | Svensson | 239/112 |
| 3,879,984 | 4/1975 | Welland | 137/110 |
| 4,019,653 | 4/1977 | Scherer et al. | 239/61 |
| 4,204,612 | 5/1980 | Schrader et al. | 239/75 |

Primary Examiner—Norman Yudkoff

[57] ABSTRACT

A plurality of spray nozzles are utilized to introduce a fluid into a vessel. Control valves are associated with each one of the plurality of spray nozzles. The control valves are either fully closed or fully open. The actual value of a process variable is compared to the desired value of the process variable to generate a difference signal. Control signals are generated in response to the difference signal. Different combinations of the control valves are opened in response to the control signals so as to provide a fluid flow rate which will maintain the actual value of the process variable substantially equal to the desired value. The on-off nature of the control valves provides a substantially maximum pressure drop across the spray nozzles when fluid is flowing through the spray nozzles.

16 Claims, 2 Drawing Figures

FLUID FLOW CONTROL

This invention relates to fluid flow control. In a particular aspect this invention relates to method and apparatus for controlling the flow of a fluid while maintaining a maximum pressure drop across a plurality of nozzles through which the fluid is flowing.

In any device which requires maximum atomization of a feed stream which stream must also be regulated in flow rate, there is a conflict in priorities. Good atomization requires maximum pressure drop across the spray nozzle. This is especially true in spraying viscous polymer solutions. A conventional flow control valve regulates flow but also introduces a pressure drop across the valve which reduces the pressure drop across the spray nozzle. Thus, use of a conventional flow control valve will provide flow control but will not provide maximum atomization of a feed stream flowing through a spray nozzle.

It is thus an object of this invention to provide method and apparatus for controlling the flow of a fluid while maintaining a maximum pressure drop across a plurality of spray nozzles through which the fluid is flowing. In this manner, maximum atomization of a feed stream and flow regulation are both provided.

In accordance with the present invention, method and apparatus is provided whereby a plurality of spray nozzles are utilized to introduce a feed stream into a device which requires maximum atomization of the feed stream. Preferably, the size of the spray nozzles varies. Each of a plurality of control valves is associated with a respective one of the plurality of spray nozzles. The control valves are either fully open or fully closed. In response to a measured or calculated process variable, different combinations of the control valves are opened to maintain a flow rate of the feed stream which will maintain the process variable substantially equal to a desired value for the process variable. Because a control valve controlling the flow of fluid through a spray nozzle will be fully open when fluid is flowing through the spray nozzle, a maximum flow rate of the fluid to the spray nozzle is provided and thus a maximum pressure drop across the spray nozzle is provided which provides maximum atomization of the feed stream. In this manner, flow control of the feed stream is provided and maximum atomization of the feed stream is also provided.

Figure 2:
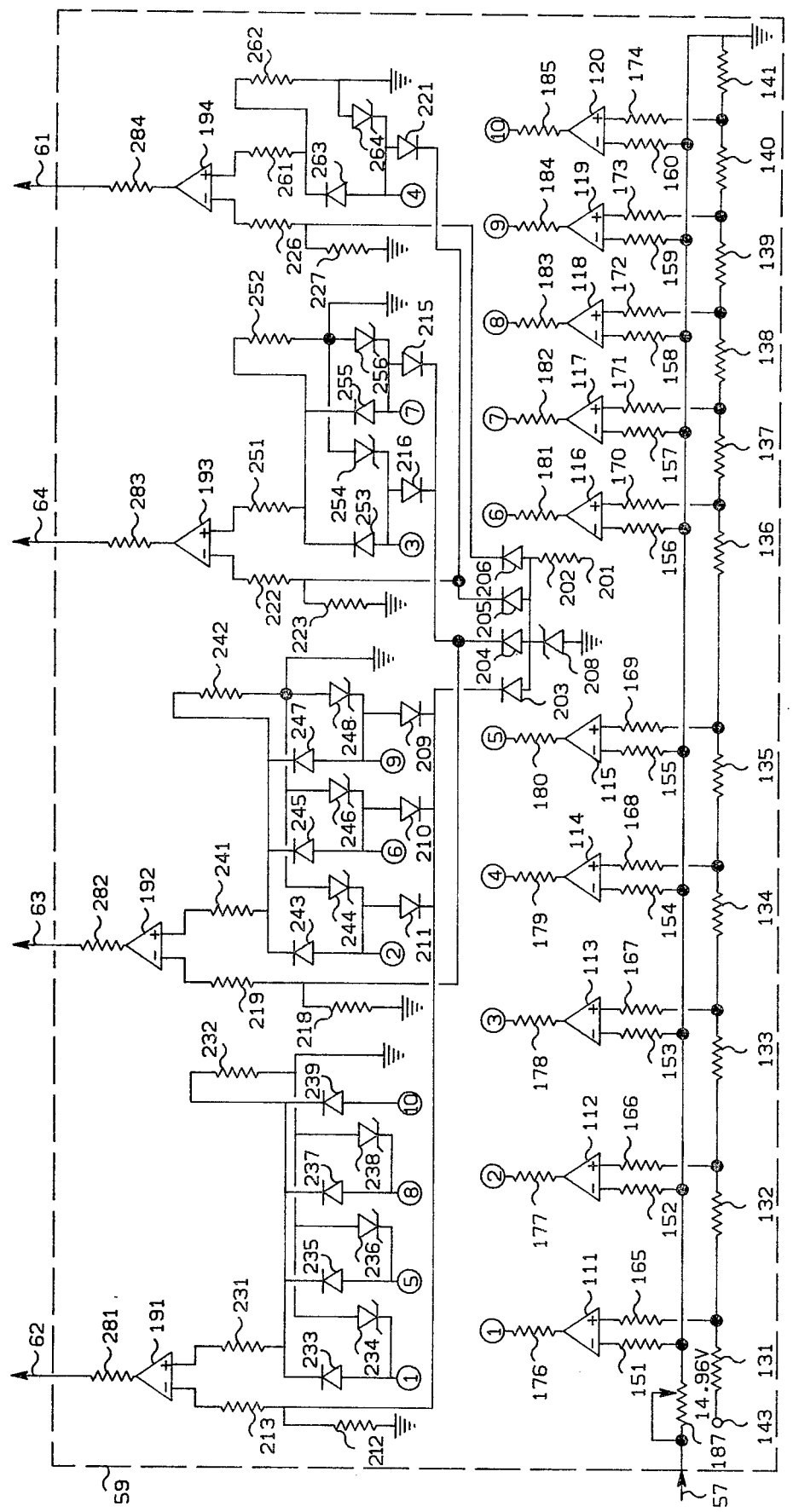

Other objects and advantages of the invention will be apparent from the foregoing brief description of the invention and from the claims as well as from the detailed description of the drawings in which:

FIG. 1 is a diagrammatic illustration of the fluid flow control system of the present invention; and FIG. 2 is a schematic illustration of the logic device illustrated in FIG. 1.

The invention is described in terms of a powder form evaporator which is utilized to recover a polymer from a solution. However, the invention is applicable to other devices which require that the feed stream be introduced in an atomized state and also require flow control of the feed stream.

The invention is described in terms of four separate spray nozzles but as few as two spray nozzles could be utilized if desired and more than four spray nozzles could be utilized. Closer flow control can be obtained with larger numbers of spray nozzles.

The invention is also described in terms of spray nozzles which each have different sizes. However, the invention is applicable to spray nozzles which are all the same size or at least some of which are the same size.

The invention is described in terms of a particular electronic configuration which is utilized to provide the desired control signals. Many different electronic configurations could be utilized to accomplish the purpose of the present invention. The invention is also described in terms of controlling the flow rate of the feed stream in response to the temperature in the powder form evaporator so as to maintain a desired temperature in the powder form evaporator. However, the invention is also applicable to control based on any process variable which may be measured or calculated and which may be affected by the flow rate of the feed stream flowing to the powder form evaporator. Also the total flow rate may be simply maintained at a predetermined desired level.

Lines designated as signal lines in the drawings are electrical in this preferred embodiment. However, the invention is also applicable to pneumatic, mechanical, hydraulic or other signal means for transmitting information. In almost all control systems some combination of these types of signals will be used. However, use of any other type of signal transmission, compatible with the process and equipment in use is within the scope of the invention.

The temperature controller shown may utilize the various modes of control such as proportional, proportional-integral, proportional-derivative, or proportional-integral-derivative. In this preferred embodiment, a proportional-integral controller is utilized but any controller capable of accepting two input signals and producing a scaled output signal, representative of a comparison of the two input signals, is within the scope of the invention. The operation of proportional-integral controllers is well known in the art. The output control signal of a proportional-integral controller may be represented as $$S = K_1 E + K_2 \int E \, dt$$

where
  S = output control signals;
  E = difference between two input signals; and
  $K_1$ and $K_2$ = constants.

The scaling of an output signal by a controller is well known in control systems art. Essentially, the output of a controller may be scaled to represent any desired factor or variable. An example of this is where a desired temperature and an actual temperature is compared by a controller. The output could be a signal representative of a desired change in the flow of some fluid necessary to make the desired and actual temperatures equal. On the other hand, the same output signal could be scaled to represent a percentage or could be scaled to represent a pressure change required to make the desired and actual temperature equal. If the controller output can range from 0 to 10 volts then the output signal could be scaled so that an output signal having a voltage level of 5.0 volts corresponds to 50 percent, some specified flow rate, or some specified pressure.

Referring now to the drawings, and in particular FIG. 1, a powder form evaporator 11 is illustrated having four spray nozzles 12–15. Preferably, the nozzle sizes are in a ratio of 1:2:3:4 with spray nozzle 12 being the smallest and spray nozzle 15 being the largest. A polymer solution, containing polymer and a solvent, is provided through the combination of conduit means 21 and 22 to the spray nozzle 14; through the combination of conduit means 21 and 23 to the spray nozzle 15; through the combination of conduit means 21, 24 and 25 to the spray nozzle 12 and through the combination of conduit means 21, 24, and 26 to the spray nozzle 13. The three-way electrical control valves 31-34 are operably located in conduit means 22, 23, 25 and 26, respectively. A purge fluid is provided through conduit means 36 to the three-way electrical control valve 31. The three-way electrical control valve 31 may be manipulated so as to provide the purge fluid to the spray nozzle 14 in order to clean out the spray nozzle 14, if the spray nozzle 14 is not being utilized, so as to prevent plugging of the spray nozzle 14 by the contents of the powder form evaporator 11. For a similar purpose, a purge stream is provided through conduit means 37 to the three-way electrical control valve 32; through conduit means 38 to the three-way electrical control valve 33 and through conduit means 39 to the three-way electrical control valve 34. Flow regulators 41-44 are operably located in conduit means 36-39, respectively. Preferably, the purge fluid is nitrogen.

The powder form evaporator 11 contains dry polymer particles. The polymer solution flashes as it enters the power form evaporator 11 and is sprayed into the bed of dry polymer particles. The dry polymer particles coat the partially dried particles which have been sprayed into the powder form evaporator 11. The remaining solvent is removed by the energy produced by mechanical agitation and the passing of a hot gas through the powder form evaporator 11.

In operation, the temperature transducer 51, in combination with a temperature measuring device such as a thermocouple which is operably located in the powder form evaporator 11, provides an output signal 52 which is representative of the temperature in the powder form evaporator 11. Signal 52 is provided from the temperature transducer 51 to the temperature controller 53. The temperature controller 53 is also provided with a set point signal 55 which is representative of the desired temperature in the powder form evaporator 11. In response to signals 52 and 55, the temperature controller 53 provides an output signal 57 which is responsive to the difference between signals 52 and 55. Signal 57 is provided as an input to the logic device 59.

In response to signal 57, the logic device 59 generates a plurality of control signals which are used to open or close the three-way electrical control valves 31-34. Control signals 61-64 are provided to relays 66-69, respectively. The relays 66-69 are actuated by the control signals 61-64 if it is desired to open to polymer flow the particular three-way electrical control valve connected to a particular relay. The output signal 71 from the relay 69 is utilized to manipulate the three-way electrical control valve 31 so as to fully open or fully close the three-way electrical control valve 31. For the same purpose, the output signal 72 from the relay 68 is supplied to the three way electrical control valve 34; the output signal 73 from the relay 67 is supplied to the three-way electrical control valve 33 and the output signal 74 from the relay 66 is supplied to the three-way electrical control valve 32.

Thus, the control signals 61-64 are generated in response to the difference signal 57 which is provided from the temperature controller 53. The value of signals 61-64 will be such that a particular flow rate of the polymer solution will be provided to the powder form evaporator 11. The flow rate will be such that a substantially desired temperature will be maintained in the powder form evaporator 11. Because the three-way electrical control valves 31-34 will be either fully open or fully closed, maximum pressure drop will be maintained across the spray nozzles 12-15 which will assure a maximum atomization of the polymer solution flowing to the powder form evaporator. Thus, flow control and maximum atomization are achieved simultaneously.

Preferably, the logic device 59 is designed so as to provide ten equal steps in flow rate using the four three-way electrical control valves 31-34. Table I illustrates the preferred logic diagram for the four three-way electrical control valves 31-34. The flow rate in gallons per minute is utilized as an example.

TABLE I

| Flow | 33 (1 gpm) | 34 (2 gpm) | 31 (3 gpm) | 32 (4 gpm) |
|---|---|---|---|---|
| 0% | — | — | — | — |
| 10 | X | — | — | — |
| 20 | — | X | — | — |
| 30 | — | — | X | — |
| 40 | — | — | — | X |
| 50 | X | — | — | X |
| 60 | — | X | — | X |
| 70 | — | — | X | X |
| 80 | X | — | X | X |
| 90 | — | X | X | X |
| 100 | X | X | X | X |

"X" = open
"—" = close

The logic could be modified to give a different number of steps in the flow rate control. For example, the logic could be modified to give a maximum of 15 equal steps with four valves. This logic diagram is illustrated in Table II.

TABLE II

| FLOW (GPM) | 33 (1 gpm) | 34 (2 gpm) | 31 (4 gpm) | 32 (8 gpm) |
|---|---|---|---|---|
| 0 | — | — | — | — |
| 1 | X | — | — | — |
| 2 | — | X | — | — |
| 3 | X | X | — | — |
| 4 | — | — | X | — |
| 5 | X | — | X | — |
| 6 | — | X | X | — |
| 7 | X | X | X | — |
| 8 | — | — | — | X |
| 9 | X | — | — | X |
| 10 | — | X | — | X |
| 11 | X | X | — | X |
| 12 | — | — | X | X |
| 13 | X | — | X | X |
| 14 | — | X | X | X |
| 15 | X | X | X | X |

Obviously, finer control could be accomplished using a larger number of spray nozzles. If five spray nozzles were utilized then 31 steps would be possible and with six spray nozzles 63 steps would be possible. These larger capacity systems would be particularly applicable where close control of the flow rate is desired.

A preferred embodiment of the logic device 59 which may be utilized to generate the logic signals required to implement the logic of Table I is illustrated in FIG. 2. Referring to FIG. 2, a plurality of operational amplifiers 111-120 are utilized to compare the output signal 57 from the temperature controller 53 to the ten voltage levels which are derived from the 11 resistors 131-141 which are in series. Preferably, each of the 11 resistors 131-141 have a value of 100 ohms. Thus, the value of the voltage at each node point in the series of resistors will be less than the previous node point by an amount equal to 1/11 of the reference voltage. The reference voltage 143 for the series of resistors 131-141 preferably has a value of 14.96 volts.

Signal 57 from the temperature controller 53 is provided to the inverting input of the plurality of operational amplifiers 111-120 through resistors 151-160, respectively. The nodes of the resistance network made up of resistors 131-141 are electrically connected to the non-inverting inputs of the operational amplifiers 111-120 through resistors 165-174, respectively. The output from the operational amplifiers 111-120 is electrically connected to pins 1-10, respectively, through resistors 176-185, respectively.

The potentiometer 187 is preferably adjusted in such a manner that when the output signal 57 from the temperature controller 53 is at a maximum voltage level, the output of the operational amplifier 111 will be barely off. As the output of the temperature controller 53 begins to drop in voltage level, the reference signal from the series of 11 resistors 131-141 will in sequence exceed the controller signal and the operational amplifiers 111-120 will go positive in sequence. This sequence will reverse as the controller output swings back towards a more positive voltage level.

The output network of the logic device 59 is primarily made up of four operational amplifiers 191-194 together with associated biasing circuitry. The pin numbers associated with operational amplifiers 111-120 are electrically connected to the corresponding pin numbers associated with the output network.

The +15 volt power supply 201 is utilized to supply a reference voltage to the inverting inputs of operational amplifiers 191-194. The +15 volt power supply 201 is electrically connected through resistor 202 to the anode of diodes 203-206 and to the cathode of Zener diode 208. The anode of Zener diode 208 is electrically connected to ground. The cathode of diode 203 is electrically connected to the cathode of diodes 209-211 and is also electrically connected to the combination of resistors 212 and 213 to the inverting input of operational amplifier 191. The cathode of diode 204 is electrically connected to the cathode of diodes 215 and 216 and is also electrically connected through the combination of resistors 218 and 219 to the inverting input of operational amplifier 192. The cathode of diode 205 is electrically connected to the cathode of diode 221 and is also electrically connected through the combination of resistors 222 and 223 to the inverting input of operational amplifier 193. The cathode of diode 206 is electrically connected through the combination of resistors 226 and 227 to the inverting input of the operational amplifier 194.

Resistors 231 and 232; diodes 233, 235, 237 and 239 and Zener diodes 234, 236 and 238 are utilized to electrically connect the outputs from operational amplifiers 111, 115, 118 and 120 to the non-inverting input of the operational amplifier 191. In like manner, resistors 241 and 242; diodes 243, 245, 247 and Zener diodes 244, 246 and 248 are utilized to electrically connect the outputs of operational amplifiers 112, 116 and 119 to the non-inverting input of operational amplifier 192. Diodes 209-211 are utilized to provide a feedback loop from the outputs of operational amplifiers 112, 116 and 119 to the inverting input of the operational amplifier 191. Resistors 251 and 252; diodes 253, 255, and Zener diodes 254 and 256 are utilized to electrically connect the outputs of operational amplifiers 113 and 117 to the non-inverting input of the operational amplifier 193. Diodes 216 and 215 are utilized to provide a feedback loop from the outputs of the operational amplifiers 113 and 117 to the inverting input of the operational amplifier 192. Resistors 261 and 262, diode 263 and Zener diode 264 are utilized to electrically connect the output of operational amplifier 114 to the non-inverting input of operational amplifier 194. Diode 221 is utilized to provide a feedback loop from the output of the operational amplifier 114 to the inverting input of operational amplifier 193.

The values of the resistors and the configuration of the diodes and Zener diodes associated with the network of the logic device 59 are chosen in such a manner that the logic required to implement the flow control illustrated in Table I is provided. Referring to Table I, it is noted that the three-way electrical control valve 33 must be open for 10 percent flow, 50 percent flow, 80 percent flow and 100 percent flow. Thus, the outputs from operational amplifiers 111, 115, 118 and 120 are tied to the non-inverting input of the operational amplifier 191 which provides control signal 73 through resistor 281. Signal 73 will go high to open the three-way pneumatic control valve 33 when 10 percent flow is required. If 20 percent flow is required, the output from the operational amplifier 192 will go high causing the three-way pneumatic control valve 34 to open while at the same time the feedback to the inverting input of operational amplifier 191 will cause the output from the operational amplifier 191 to go negative which will close the three-way pneumatic control valve 33. The three-way pneumatic control valve 33 will remain closed to the flow of the polymer solution until the output of the operational amplifier 115 goes positive.

The invention has been described in terms of its presently preferred embodiment as is shown in FIGS. 1 and 2. For the sake of convenience, signals which supply power to the various chips shown in the schematic of FIG. 2 have been omitted. Voltage levels required by the various chips are specified by the manufacturer and are well known to those familiar with the art.

As has been previously stated, many different circuit configurations are possible which would perform the functions required of the circuits shown in FIG. 2. FIG. 2 is illustrative of a particular circuit configuration which will perform the required functions.

The control components illustrated in FIG. 1 such as the temperature transducer 51 and its associated thermocouple, the temperature controller 53, the three-way electrical control valves 31-34, and the flow regulators 41-44 are each well known, commercially available control components such as are described at length in *Perry's Chemical Engineer's Handbook*, 4th Edition, Chapter 22, McGraw-Hill. The relays 66-69 may be the solid state relays manufactured by Potter and Brumfield, Princeton, Ind.

Commercially available components which can be utilized in the electrical schematic illustrated in FIG. 2 are as follows. Values of the resistors are also presented.

| | |
|---|---|
| Operational Amplifiers 111-120 | LM 324, National Semiconductor |
| Operational Amplifiers 191-194 | LM 324, National |

| | |
|---|---|
| Potentiometer 187 | Semiconductor<br>1 K ohm |
| Diodes 233, 235, 237, 239, 243, 245, 247, 209, 210, 211, 253, 255, 216, 215, 263, 221, and 203-206 | 1N914, Fairchild Semiconductor |
| Zener diode 234 | 3.9 v, mz 4622 Motorola |
| Zener diode 236 | 5.6 v, mz 4626 Motorola |
| Zener diode 238 | 7.5 v, IN 4100 Motorola |
| Zener diode 244 | 4.3 v, mz 4623 Motorola |
| Zener diode 246 | 6.2 v, mz 4627 Motorola |
| Zener diode 248 | 8.2 v, IN 4101 Motorola |
| Zener diode 254 | 4.7 v, mz 4624 Motorola |
| Zener diode 256 | 6.8 v, IN 4099 Motorola |
| Zener diode 264 | 5.1 v, mz 4625 Motorola |
| Zener diode 208 | 2.0 v, mz 4615 Motorola |
| Resistors 131-141 | 100 ohm |
| Resistors 151-160, 165-174, 213, 231, 219, 241, 222, 251, 226 and 261 | 20 K ohm |
| Resistor 176 | 430 ohms |
| Resistor 177 | 390 ohms |
| Resistor 178 | 360 ohms |
| Resistor 179 | 330 ohms |
| Resistor 180 | 300 ohms |
| Resistor 181 | 270 ohms |
| Resistor 182 | 220 ohms |
| Resistor 183 | 180 ohms |
| Resistor 184 | 150 ohms |
| Resistors 212, 232, 218, 242, 223, 252, 227 and 262 | 1 M ohm |
| Resistors 281-284 and 185 | 1 K ohm |
| Resistor 202 | 1 M ohm |

While the invention has been described in terms of the presently preferred embodiment, reasonable variations and modifications are possible by those skilled in the art within the scope of the described invention and the appended claims.

That which is claimed is:

1. Apparatus comprising:
   a vessel;
   at least first and second spray nozzles for spraying a fluid into said vessel;
   first conduit means for supplying a fluid stream to said first spray nozzle;
   second conduit means for supplying a fluid stream to said second spray nozzle;
   first on-off valve means operably located in said first conduit means;
   second on-off valve means operably located in said second conduit means;
   means for establishing a first process signal representative of the actual value of a variable associated with the process occurring in said vessel;
   means for establishing a second process signal representative of the desired value of said variable associated with the process occurring in said vessel;
   means for comparing said first signal and said second process signal and for establishing a third process signal responsive to the difference between said first process signal and said second process signal;
   means for establishing first and process second control signals in response to said third process signal;
   means for manipulating said first on-off valve means in response to said first control signal; and
   means for manipulating said second on-off valve means in response to said second control signal, the manipulation of said first on-off valve means in response to said first control signal and the manipulation of said second on-off valve means in response to said second control signal providing control of the flow rate of fluid into said vessel so as to maintain said actual value of said variable substantially equal to said desired value of said variable, the maintaining of said first on-off valve means and said second on-off valve means in either an on condition or an off condition providing a substantially maximum pressure drop across said first spray nozzle or said second spray nozzle when fluid is flowing through said first spray nozzle or said second spray nozzle.

2. Apparatus in accordance with claim 1 additionally comprising:
   third and fourth spray nozzles for spraying a fluid into said vessel;
   third conduit means for supplying a fluid stream to said third spray nozzle;
   fourth conduit means for supplying a fluid stream to said fourth spray nozzle;
   third on-off valve means operably located in said third conduit means;
   fourth on-off valve means operably located in said fourth conduit means;
   means for establishing third and fourth control signals in response to said third process signal;
   means for manipulating said third on-off valve means in response to said third control signal; and
   means for manipulating said fourth on-off valve means in response to said fourth control signal.

3. Apparatus in accordance with claim 2 wherein said vessel is a particle form evaporator means and the fluid sprayed into said particle form evaporator means is a polymer solution.

4. Apparatus in accordance with claim 3 wherein said variable associated with the process occurring in said vessel is the temperature in said particle form evaporator means.

5. Apparatus in accordance with claim 4 wherein the size ratio of said first spray nozzle to said second spray nozzle is 1:2, wherein the size ratio of said second spray nozzle to said third spray nozzle is 1:2, and wherein the size ratio of said third spray nozzle to said fourth spray nozzle is 1:2.

6. Apparatus in accordance with claim 3 additionally comprising:
   means for supplying a purge fluid to said first spray nozzle when said polymer solution is not flowing to said first spray nozzle;
   means for supplying a purge fluid to said second spray nozzle when said polymer solution is not flowing to said second spray nozzle;
   means for supplying a purge fluid to said third spray nozzle when said polymer solution is not flowing to said third spray nozzle; and
   means for supplying a purge fluid to said fourth spray nozzle when said polymer solution is not flowing to said fourth spray nozzle.

7. Apparatus in accordance with claim 2 wherein said means for establishing said first and second control signals and said means for establishing said third and fourth control signals comprise:
   means for establishing a plurality of reference voltages having desired magnitudes and relationships;
   means for comparing said third process signal to each one of said plurality of reference voltages and for establishing a plurality of comparison signals in response to the comparison of said third process signal to each respective one of said plurality of reference voltages, each one of said plurality of comparison signals having a positive voltage level only if the respective comparison signal has a higher voltage level than said third process signal; and means for establishing said first, second, third and fourth control signals in response to said plurality of comparison signals which have a positive voltage level, said first, second, third and fourth control signals having a first value if it is desired to turn a respective on-off valve means on, said first, second, third and fourth control signals having a second value if it is desired to turn a respective on-off valve means off.

8. Apparatus in accordance with claim 7 wherein said plurality of reference voltages comprises first, second, third, fourth, fifth, sixth, seventh, eighth, ninth and tenth reference voltages, said first reference voltage being 1/11 greater than said second reference voltage, said second reference to voltage being 1/11 greater than said third reference voltage, said third reference voltage being 1/11 greater than said fourth reference voltage, said fourth reference voltage being 1/11 greater than said fifth reference voltage, said fifth reference voltage being 1/11 greater than said sixth reference voltage, said sixth reference voltage being 1/11 greater than said seventh reference voltage, said seventh reference voltage being 1/11 greater than said eighth reference voltage, said eighth reference voltage being 1/11 greater than said ninth reference voltage, said ninth reference voltage being 1/11 greater than said tenth reference voltage, and wherein said plurality of comparison signals comprises first, second, third, fourth, fifth, sixth, seventh, eighth, ninth and tenth comparison signals.

9. A method for controlling the flow of a fluid through at least first and second spray nozzles into a vessel comprising the steps of:
establishing a first process signal representative of the actual value of a variable associated with the process occurring in said vessel;
establishing a second process signal representative of the desired value of said variable associated with the process occurring in said vessel;
comparing said first process signal and said second process signal and establishing a third process signal responsive to the difference between said first process signal and said second process signal;
establishing first and second signals in response to said third process signal;
allowing said fluid to flow to said first spray nozzle at a substantially maximum flow rate if said control signal has a first value;
terminating the flow of said fluid to said first spray nozzle if said first control signal has a second value;
allowing said fluid to flow to said second spray nozzle at a substantially maximum flow rate if said second control signal has a first value; and
terminating the flow of said fluid to said second spray nozzle if said second control signal has a second value, the on-off manipulation of the flow of said fluid to said first spray nozzle in response to said first control signal and the on-off manipulation of the flow of said fluid to said second spray nozzle in response to said second control signal providing control of the flow of fluid into said vessel so as to maintain said measured value of said variable substantially equal to said desired value of said variable and also providing a substantially maximum pressure drop across said first spray nozzle and said second spray nozzles when said fluid is flowing through said first spray nozzle or said second spray nozzle.

10. A method in accordance with claim 9 additionally comprising the steps of:
introducing said fluid into said vessel through third and fourth spray nozzles in addition to said first and second spray nozzles;
establishing third and fourth control signals in response to said third process signal;
allowing said fluid to flow to said third spray nozzle at a substantially maximum flow rate if said third control signal has a first value;
terminating the flow of said fluid to said third spray nozzle if said third control signal has a second value;
allowing said fluid to flow to said fourth spray nozzle at a substantially maximum flow rate if said fourth control signal has a first value; and
terminating the flow of said fluid to said fourth spray nozzle if said fourth control signal has a second value.

11. A method in accordance with claim 10 wherein said vessel is a particle form evaporator means and the fluid sprayed into said particle form evaporator means is a polymer solution.

12. A method in accordance with claim 11 wherein said variable associated with the process occurring in said vessel is the temperature in said particle form evaporator means.

13. A method in accordance with claim 12 wherein the size ratio of said first spray nozzle to said second spray nozzle is 1:2, wherein the size ratio of said second spray nozzle to said third spray nozzle is 1:2, and wherein the size ratio of said third spray nozzle to said fourth spray nozzle is 1:2.

14. A method in accordance with claim 13 additionally comprising the steps of:

supplying a purge fluid to said first spray nozzle when said polymer solution is not flowing to said first spray nozzle;

supplying a purge fluid to said second spray nozzle when said polymer solution is not flowing to said second spray nozzle;

supplying a purge fluid to said third spray nozzle when said polymer solution is not flowing to said third spray nozzle; and supplying a purge fluid to said fourth spray nozzle when said polymer solution is not flowing to said fourth spray nozzle.

15. A method in accordance with claim 10 wherein said step of establishing said first and second control signals and said step of establishing said third and fourth control signals comprises:

establishing a plurality of reference voltages having desired magnitudes and relationships;

comparing said third signal to each one of said plurality of reference voltages and establishing a plurality of comparison signals in response to the comparison of said third signal to each one of said plurality of reference voltages, each one of said plurality of comparison signals having a positive voltage level only if the respective comparison signal has a higher voltage level than said third signal; and establishing said first, second, third and fourth control signals in response to said plurality of comparison signals which have a positive voltage level, said first, second, third and fourth control signals having a first value if it is desired to turn a respective on-off valve means on, said first, second, third and fourth control signals having a second value if it is desired to turn a respective on-off valve means off.

16. A method in accordance with claim 15 wherein said plurality of reference voltages comprises first, second, third, fourth, fifth, sixth, seventh, eighth, ninth and tenth reference voltages, said first reference voltage being 1/11 greater than said second reference voltage, said second reference voltage being 1/11 greater than said third reference voltage, said third reference voltage being 1/11 greater than said fourth reference voltage, said fourth reference voltage being 1/11 greater than said fifth reference voltage, said fifth reference voltage being 1/11 greater than said sixth reference voltage, said sixth reference voltage being 1/11 greater than said seventh reference voltage, said seventh reference voltage being 1/11 greater than said eighth reference voltage, said eighth reference voltage being 1/11 greater than said ninth reference voltage, said ninth reference voltage being 1/11 greater than said tenth reference voltage, and wherein said plurality of comparison signals comprises first, second, third, fourth, fifth, sixth, seventh, eighth, ninth and tenth comparison signals.

* * * * *

UNITED STATES PATENT AND TRADEMARK OFFICE
CERTIFICATE OF CORRECTION

PATENT NO. : 4,263,091
DATED : April 21, 1981
INVENTOR(S) : William R. King

It is certified that error appears in the above–identified patent and that said Letters Patent are hereby corrected as shown below:

Column 8, claim 6, line 43, after "claim", delete "3" and insert therefor --- 5 ---.

Column 9, claim 9, line 47, after "second", insert --- control ---.

Signed and Sealed this

Sixth Day of October 1981

[SEAL]

Attest:

GERALD J. MOSSINGHOFF

Attesting Officer     Commissioner of Patents and Trademarks